DIGITAL DECODING APPARATUS

Filed Sept. 25, 1963 2 Sheets-Sheet 1

| OVERFLOW | 1.00 REF | OVERFLOW | 1.00 REF | OVERFLOW | 1.00 REF |
|---|---|---|---|---|---|
| | 1.11 | | 0.11 | | 1.01 |
| 1 | 0.11 | 0 | 1.11 | 1 | 0.01 |
| | 1.11 | | 0.11 | | 1.01 |
| 1 | 0.10 | 1 | 0.10 | 0 | 1.10 |
| | 1.11 | | 0.11 | | 1.01 |
| 1 | 0.01 | 0 | 1.01 | 1 | 0.11 |
| | 1.11 | | 0.11 | | 1.01 |
| 1 | 0.00 | 1 | 0.00 | 1 | 0.00 |
| | 1.11 | | 0.11 | | 1.01 |
| 0 | 1.11 | 0 | 0.11 | 0 | 1.01 |
| | 1.11 | | 0.11 | | 1.01 |
| 1 | 1.10 | 0 | 1.10 | 1 | 0.10 |
| | 1.11 | | 0.11 | | 1.01 |
| 1 | 1.01 | 1 | 0.01 | 0 | 1.11 |
| | 1.11 | | 0.11 | | 1.01 |
| 1 | 1.00 | 0 | 1.00 | 1 | 1.00 |
| | ETC. | | ETC. | | ETC. |

INVENTORS
Branton S. Horton &
John D. Michaels
BY Paul J. Etherington
ATTORNEY

INVENTORS
Branton S. Horton &
John D. Michaels
BY Paul J. Ethington
ATTORNEY

United States Patent Office 3,292,173

Patented Dec. 13, 1966

3,292,173

DIGITAL DECODING APPARATUS

Branton S. Horton, Torrance, and John D. Michaels, Los Angeles, Calif., assignors to General Motors Corporation, Detroit, Mich., a corporation of Delaware Filed Sept. 25, 1963, Ser. No. 311,556
4 Claims. (Cl. 340—347)

This invention relates to the decoding of digital information by converting the digital information into analog form.

The prior art technique for decoding digital information can, with few exceptions, be divided into two general classifications, viz., weighting decoders and counting decoders. As is well known, the numerical representation of a number to be decoded in a weighting decoder is used to switch electrical sources into a ladder network. The network is designed such that the output voltage is directly proportional to the number being decoded. A second subcategory of weighting decoders may be described as one which uses the principle of developing open or short circuits through a switching mechanism such as a relay. In this technique, resistors are connected into or disconnected from a voltage divider network with the resistors weighted in value in such a manner that the number will be decoded in a linear fashion.

In a counting decoder, the digital number which is to be decoded is placed in a storage register of a fixed length. From the contents of the register, a specified quantity is subtracted at a constant rate. If the number being decoded is positive, a voltage of some known value is connected to an output when the subtraction starts and remains connected until the contents of the register which is continually being subtracted from is zero. Since the number system in a counting decoder is substantially continuous, the number to be decoded will reappear in the register. At this time the known voltage is again connected to the output. This cycle repeats itself, thus, providing on the output a square waveform with a positive or negative amplitude depending on whether the number to be decoded is positive or negative. The width of the positive or negative portion of the square waveform per cycle is proportional to the magnitude of the number being decoded. Those skilled in the art will appreciate that the maximum width of the positive or negative portion of the output cycle from a counting decoder is one-half of the period of one cycle. Thus, a charging capacitor which is used to smooth the output square wave will be, at best, collecting a charge during half of the cycle and then be discharging during the other half of the cycle. For any number having a pulse width less than half of a cycle, the discharge time increases proportionately. Obviously, the ripple content of this output is disadvantageously large.

The present invention relates to a technique of decoding digital information which is not readily classifiable into either of the above categories. The invention prescribes a simplified technique of decoding which, when implemented, results in the elimination of a large number of precision components required in a weighting type decoder. Consequently, the invention effects a reduction in size and weight and precision in the required apparatus. Additionally, the present technique results in a substantial and beneficial reduction in the problems related to ripple content of the output of a counting type decoder.

The present invention may be broadly described as the conversion of digital information which may be contained in a storage register into analog form such as a D.C. voltage amplitude. This is accomplished by digitally adding the digital representation of the quantity to be decoded to a digital reference quantity. Upon addition of a preselected digit of the representation being decoded, the adder provides a signal corresponding to either the presence or absence of an overflow depending upon the value of the preselected digits. The quantity to be decoded is repeatedly recirculated through the register to the input of the adder. Furthermore, the results of the addition process are recirculated to the other input of the adder such that the reference quantity is continually being modified. This addition process may be continued as long as is desired. The rate of occurrences of overflows from the addition techniques are sensed and are used to generate signals of distinct character respectively representing the presence and absence of overflows. Finally, the signals are averaged over a predetermined cycle length which is related to the length of the digital quantity being decoded. This averaging procedure results in an analog quantity which is the decoded representation of the original digital quantity.

The basic invention, along with refinements thereof, may be more readily understood upon reading the following specification describing a particular embodiment of the invention. The specification is to be taken with the accompanying drawings of which:

Figures 1, 2:
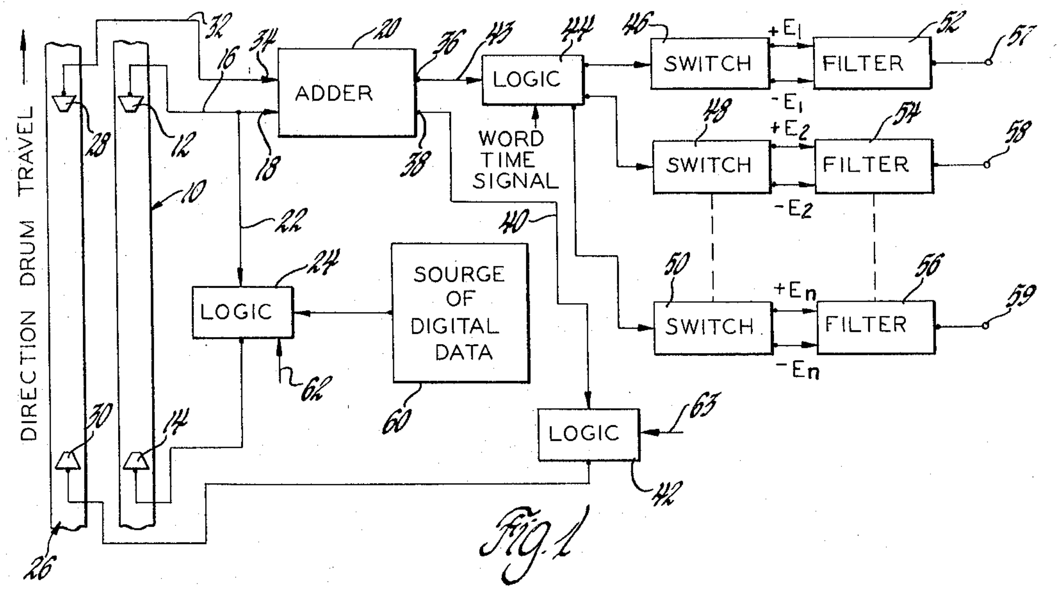
FIGURE 1 is a block diagram of an illustrative embodiment of the invention indicating the basic information flow within the system.
FIGURE 2 is a number chart illustrating the inventive decoding technique as applied to three binary digital representations.

Referring now to FIGURE 1, this illustrative embodiment concerns a system for serially decoding a plurality of digital words or numbers which are stored in serial binary form on a register 10 which takes the form of a magnetic memory drum. The drum register 10 is provided with a magnetic read head 12 and a magnetic write head 14. The read head 12 and the write head 14 are spaced a predetermined number of digital bits apart as is prescribed by the combination or product of the number of words to be decoded and the number of bits per word. The combination of the read and write heads 12 and 14 is commonly known as a revolver. As stated, digital information is serially stored in the drum register 10 in accordance with conventional binary code to represent a word or number as will be subsequently decribed. Motion of the register 10 past the read head 12 generates signals in the read head 12 which are transmitted via an information path 16 to a first input 18 of an adder 20. Adder 20 is a full digital adder of the type commonly known in the digital computer art. The signals appearing on the information path 16 are also conveyed via path 22 and a gate circuit 24 back to the write head 14 where the information is rewritten into the drum register 10 to be recirculated for reasons which will be explained in the following. Reference signals are stored in serial binary form in a second drum register 26. Associated with the second drum register 26 are a read head 28 and a write head 30 corresponding to read and write heads 12 and 14 respectively. The second drum register 26 is also adapted to store digital information in serial form and is displaced past the read head 28 at the same rate the first drum register 10 is displaced past the read head 12. Information which is picked up by the read head 28 is transmitted via path 32 to the second input 34 of adder 20.

Adder 20 has outputs 36 and 38. The signal appearing on output 38 corresponds to the digital sum of the digital quantities which are provided on inputs 18 and 34. Accordingly, the addition of two three-digit numbers provides a three-digit sum on output 38. This signal is transmitted via path 40 through a logic or gate circuit 42 which is used for initialization purposes to the write head 30 of the second drum register 26. Accordingly, a circulation path for the second drum register 26 is defined by the combination of elements including register 26, read head 28, path 32, output 38 of adder 20, path 40, logic circuit 42 and the write head 30.

The second output 36 of adder 20 corresponds to what is conventionally known as a carry or overflow signal. Accordingly, upon the addition of the last or highest order digits of the numbers on inputs 18 and 34, a signal is produced on output 36 which corresponds to either the presence or absence of an overflow. This signal is communicated via path 43 and a logic circuit 44 to one of a plurality of signal responsive switches 46, 48 or 50. As indicated in drawings, any number of switches may be provided in accordance with the number of words or numbers being decoded. However, in this instance only three have been shown. Logic circuit 44 is a form of distribution circuit which is responsive to what is indicated as a word-time signal to route the overflow signal on path 43 to whichever one of the switches corresponds with the word or number in the sequence to be decoded. Each of the switches 46, 48 and 50 is responsive to the presence of an overflow signal to provide a first distinct output signal quantity, in this case, corresponding to a positive voltage of known magnitude +E. Additionally, each of the switches is responsive to the absence of an overflow signal to provide a second distinct signal level, in this case, indicated by a negative voltage −E. Each of the switches 46, 48 and 50 is connected into a double-ended filter circuit 52, 54 and 56 respectively. The filter circuits are connected to receive the positive and negative voltage values from the switch circuits and to average the resulting voltages over a predetermined cycle length which is related to the number of bits in the word being decoded. Analog outputs are, thus, provided on the filter outputs 57, 58 and 59. The analog voltage on output 57 corresponds with a first word being decoded, the output voltage on filter output 58 corresponds with a second word or number being decoded and so forth.

The words or numbers to be decoded are written into the first register 10 from a source of digital data 60. This source is connected to the gate circuit 24 such that proper signalling on a gate circuit trigger input 62 completes a signal path to the write head 14. The information from source 60 may come in either serial or parallel form in accordance with the nature of the source. It is to be understood that the source may take the form of parallel computer output lines in which case the present implementation would require a shift register or other means to convert the parallel digital information into serial form for writing into the drum register 10. It is further to be understood that the registers 10 and 26 are shown in the form of circulating drums merely by way of illustration and may take the form of any other type of addressable memory device. Examples of other devices which could be used are glass delay lines, magnetostrictive delay lines, shifting registers composed of flip-flops or magnetic cores. Whichever form of memory device is used in the illustrative system must, of course, have the capability of providing one bit of information at a time at a given clock rate. It will be apparent that the addition process may be accomplished in a parallel manner as well as serial.

Figure 3:
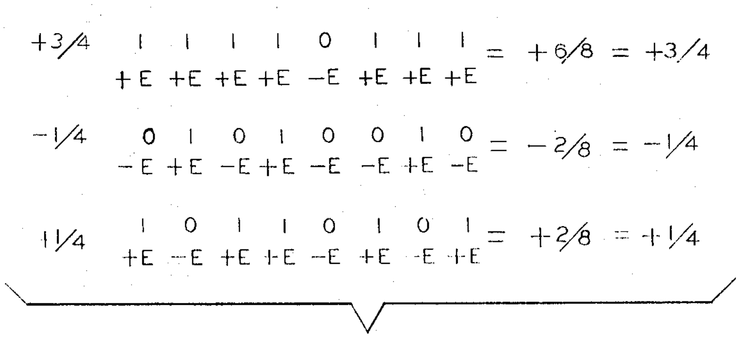
FIGURE 3 is a number chart illustrating the principle of obtaining the true meaning of the examples of FIGURE 2.

To facilitate an understanding of the present invention and the operation thereof, reference should be had to FIGURES 2 and 3, which are numerical charts of specific examples of the decoding operation. Each of these examples assumes a three bit number, the left-hand bit of which is a sign bit. That is, a 1 indicates a positive number and a 0 indicates a negative number. Additionally, the present system as here illustrated, is designed to decode only numbers less than 1. In accordance with conventional binary practice the central digits of a positive number represents the multiplier of the $2^{-1}$ term. Similarly, the right-hand digit of each three digit number corresponds with the multiplier of the $2^{-2}$ term. It should further be noted that a negative number is represented as the 2's complement of a positive number. Referring then to FIGURE 2, it can be seen that the first example of a number to be decoded is 1.11 which represents +¾. Recalling that negative numbers are represented as the 2's complement of a positive number, in the middle column 0.11 represents −¼. In the third column, the number to be decoded is 1.01 which represents +¼.

Having defined the number system with which the illustrative embodiment of the invention operates, a detailed description of a decoding process will be given. In this example, it will be assumed that only the single number 1.11 is to be decoded. To load the registers, input 62 of gate 24 is energized to allow the number 1.11 to be entered into register 10 from source 60. This three bit number is serially placed into the drum of register 10. Secondly, an initialization input 63 of gate circuit 42 is energized by a proper source (not shown) to enter the number 1.00 into register 26. The read and write heads in the two revolvers are then placed an effective distance of three bits apart in order to properly set up the recirculation paths. Once the registers 10 and 26 are properly loaded, inputs 62 and 63 are deenergized and the actual decoding process is begun. The digits from the registers 10 and 26 are circulated past the read heads 12 and 28 where bit signals are generated and transmitted via paths 16 and 32 to the inputs 18 and 34 of adder 20. Trigger input 62 of gate circuit 24 is in the proper state to unblock the recirculation path through path 22. Accordingly, the number 1.11 being decoded recirculates around the path defined by read head 12, paths 16 and 22, gate circuit 24 and write head 14. The first addition process in adder 20 corresponds with the addition of reference number 1.00 from register 26 and the number to be decoded 1.11 from register 10. As can be seen from FIGURE 2, the result of this addition is the binary number 0.11 with an overflow of 1. The number 0.11 emerges on output 38 and is recirculated via path 40 and logic circuit 42 to the write head 30 where it is rewritten into drum register 26, in place of the reference number 1.00. Upon the addition of the highest order digits, a carry or overflow of 1 was produced. This overflow emerges on output 36 and is transmitted via path 43 and logic circuit 44 to the switch 46. Inasmuch as only one word is being decoded, only one switch and filter circuit combination is required. Switch 46 is responsive to the overflow signal to present a +E voltage to the filter circuit 52. This voltage remains until the next addition process takes place at which time either the same voltage or a minus voltage will be switched into filter 52.

The second addition process is made between the three bit result (0.11) of the first addition, as recirculated to drum register 26, and the number 1.11 being decoded, as recirculated to drum register 10 via path 22. The second addition produces the sum 0.10 and an overflow of 1. The number 1.11 is again recirculated to register 10 and the result 0.10 is recirculated to register 26 where it replaces the previous reference number. Because of a 1 over-flow a +E voltage is again switched into filter circuit 52.

As indicated in the left-hand columns of FIGURE 2, the addition process continues until the original reference number 1.00 reappears in the register 26. The process may then continue in a manner similar to that described or it may be terminated at this point. It may be seen that each addition step produces either a 1 or 0 overflow which causes a +E or −E voltage to be switched into filter circuit 52 for a fixed length of time. This time is, of course, equal to the time required to read and recirculate one word, since in the above example only one word is being decoded. All of the voltage pulses, either +E or −E, are thus of the same width.

The pattern of overflows shown in FIGURE 2 is reproduced in FIGURE 3. Each 1 overflow is assigned a value +E and each 0 overflow is assigned a value −E.

Since a three bit number is here decoded, eight addition cycles are required to return the reference number to its original value of 1.00. The addition being cyclic, it is obvious that any three bit reference word may be used for initialization purposes. By assigning each voltage pulse a component value of ⅛, adding up the pulses according to sign produces a result of +6/8 or +¾. This averaging process is effectively performed by the filter 52 to produce an analog voltage on output 57 which corresponds to the digital input 1.11.

The decoding of a negative number 0.11 may be observed with reference to the second column of FIGURES 2 and 3. The number 0.11 is again added to a reference number such as 1.00 with the recirculation processes occurring as previously described. The addition continues for eight cycles to produce a pattern of overflows as shown. This pattern is peculiar to the number 0.11 and may be represented by a pattern of distinct voltage pulses such as shown in FIGURE 3. When the voltage pulses are averaged, the negative analog quantity −¼ appears at the output of the filter circuit used.

Examination of the three examples of FIGURES 1 and 2 shows that the number of bits per word and the numerical resolution obtainable may be increased as required by proper and straightforward modification of the resolvers and adder 20. It is also apparent that the drum register 10 may contain more than one word at a time. For example, all three words may be held in serial fashion with the read and write heads being separated by nine bits, on each register. The three (or more) words are individually processed in serial fashion, and the resulting patterns of overflows are kept separate by logic circuit 44 which is synchronized with the rate of displacement of registers 10 and 26. Every three bit-times, or one word-time, logic 44 is advanced by a signal to switch the overflow signals to the appropriate switch and filter combinations.

Figure 4:
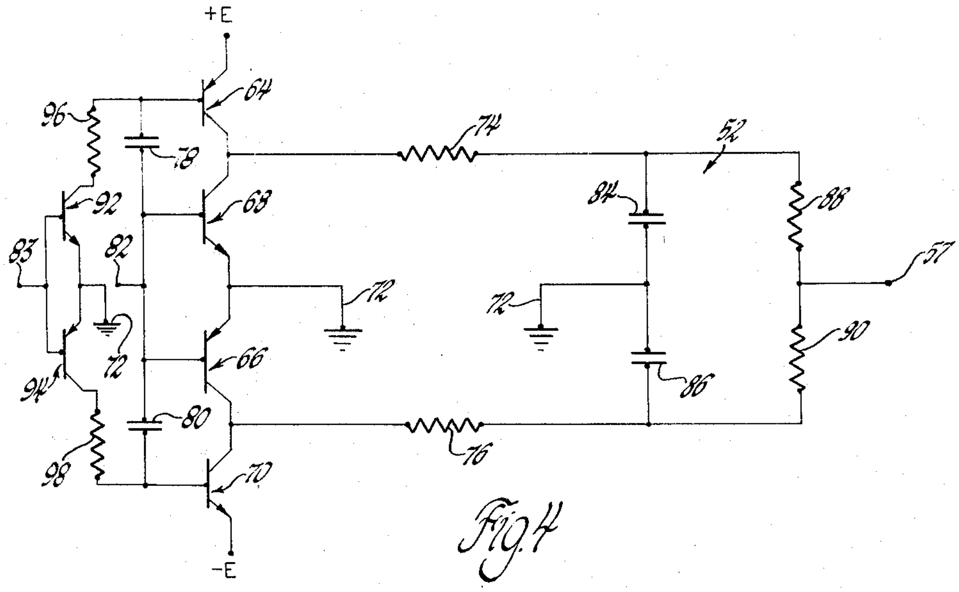
FIGURE 4 is a schematic circuit diagram of an illustrative output stage configuration.

Referring now to FIGURE 4, a simplified schematic representation of a suitable switch and filter circuit combination is shown. The switch consists of a pair of PNP transistors 64 and 66 and a pair of NPN transistors 68 and 70. The emitter electrodes of the transistors 64 and 70 are respectively connected to positive and negative voltage sources indicated as +E and −E. The emitter electrodes of transistors 66 and 68 are commonly connected to a grounded point 72. The collector junction of transistors 64 and 68 is connected through a resistor 74 to one side of a double-ended filter circuit 52 and the collector junction of transistors 66 and 70 is connected through a resistor 76 to the other side. The input or base electrodes of the transistors are connected via synchronizing capacitors 78 and 80 to an input point 82 which is connected with the logic circuit 44 of FIGURE 1. The input point 82 receives either a true or false output depending on the overflow signal generated at 20. The switch further includes transistors 92 and 94 which are NPN and PNP types respectively. The emitters of the transistors 92 and 94 are connected to ground 72 while the collectors are connected through resistors 96 and 98 to the base electrodes of transistors 64 and 70 respectively. The base electrodes of transistors are commonly connected to input point 83. The signal appearing at point 83 is the negated value of the signal appearing at point 82. Thus, if the signal at 82 is true, the signal at 83 is false. In this configuration the transistors 92 and 94 provide a voltage level shift to switch transistors 64, 66, 68 and 70 between alternate states of conductivity.

The filter circuit 52 comprises capacitors 84 and 86 which are connected between the ends of the filter and the ground point 72. Resistors 88 and 90 are connected in parallel with capacitors 84 and 86 and the junction of the resistors is connected to output 57.

A high voltage input signal at 82 and a low voltage at 83 is effective to bias transistors 68 and 70 into saturation and to turn off transistors 64 and 66. This action connects one side of the filter to ground and the other side to the −E voltage source. Opposite input signals effect the opposite state to connect the +E voltage source to the other side of the filter. The purpose of the circuit of FIGURE 4 is to operate transistor pairs 64 and 66, and 68 and 70 alternately and simultaneously such that one pair conducts while the other is off. By equating the first signals to the presence of an overflow from adder 20 and the second signals to the absence of an overflow, the desired pattern of voltages may be obtained. The invention is, of course, not limited to the particular circuitry shown in FIGURE 4.

It is to be understood that while the invention has been shown and described with reference to a particular embodiment thereof, it is contemplated that various modifications will be apparent to those skilled in the art. Accordingly, for a definition of the invention, reference should be had to the appended claims.

What is claimed is:

1. Digital to analog conversion apparatus comprising first register means for repeatedly making available for computation a digital representation of a quantity, second register means for providing a digital reference quantity, adder means connected to receive the digital representation and the reference quantity and to add the same, means to repeatedly recirculate the result of the addition to the second register means for consequent addition with the digital representation, means connected to receive the output of the adder means and to produce a positive signal quantity upon the occurrence of an overflow and to produce a negative signal quantity upon the absence of an overflow, and means connected to receive and to average the positive and negative signal quantities over a predetermined cycle length.

2. Digital to analog conversion apparatus comprising means for repeatedly making available for processing a digital representation of a quantity, means for providing a digital reference quantity, added means having first and second inputs and first and second outputs, the first and second inputs being connected to receive the digital representation and reference quantities, respectively, for addition in the adder means, the first output presenting a signal corresponding to the digital representation of the sum of the quantities added and the second output presenting a signal corresponding to the presence of an overflow from the addition of the highest order digits of said quantities, means to repeatedly recirculate the first output signal to the second input for consequent addition with the digital representation, bistable switch means connected to receive the second output signal and responsive to the presence and absence of an overflow to present two distinct output voltage levels respectively corresponding thereto, and filter means connected to receive the output of the switch means to average said output over a predetermined cycle length.

3. Digital to analog conversion apparatus comprising means for repeatedly making available, for conversion, a sequence containing a predetermined number of digital words, means for providing digital reference words, digital added means having first and second inputs and first and second outputs, the first and second inputs being connected to receive the digital words being converted and the reference words, respectively, for addition in the adder means, the first output presenting a signal corresponding to the digital representation of the sum of the words being added and the second output presenting a signal corresponding to the presence or absence of an overflow from the addition of the highest order digits of said words, means to direct the first output signal to the second mentioned means to repeatedly modify the reference words to correspond with the results of the additions, a predetermined number of bistable switch means corresponding in number to the number of digital words being converted, each being responsive to the presence and absence of an input signal, respectively, to present two distinct output voltage levels, individual filter means connected to receive the outputs of the switch means to average said outputs over predetermined cycle lengths, and logic means connecting the second output signal of the adder means to the switch means and synchronized with the first mentioned means to sequentially direct the second output signals to corresponding switch means.

4. Digital to analog conversion apparatus comprising a first register for holding the digital representation of a quantity to be converted, a second register for holding a digital reference quantity, a digital adder having two input channels and two output channels corresponding to sum and overflow, means for serially entering the contents of the first and second registers into the two input channels of the adder, means for recirculating the contents of the first register, means connected to the sum output channel of the adder to recirculate the signals appearing thereon to the second register, a bistable switch connected to the overflow channel of the adder and responsive to the presence and absence of an overflow signal to present two distinct signal levels, and filter means connected to the switch to average the signal levels over a predetermined time period.

No references cited.

MAYNARD R. WILBUR, *Primary Examiner.*

DARYL W. COOK, *Examiner.*

K. R. STEVENS, *Assistant Examiner.*